United States Patent
Vaccari

(10) Patent No.: US 9,706,750 B2
(45) Date of Patent: Jul. 18, 2017

(54) MODULAR CAGE FOR PETS, IN PARTICULAR RABBITS

(75) Inventor: Carlo Vaccari, Castelgomberto (IT)

(73) Assignee: FERPLAST SPA, Castelgomberto (IT)

(*) Notice: Subject to any disclaimer, the term of this patent is extended or adjusted under 35 U.S.C. 154(b) by 137 days.

(21) Appl. No.: 14/401,711

(22) PCT Filed: May 16, 2012

(86) PCT No.: PCT/IB2012/052462
§ 371 (c)(1),
(2), (4) Date: Apr. 9, 2015

(87) PCT Pub. No.: WO2013/171546
PCT Pub. Date: Nov. 21, 2013

(65) Prior Publication Data
US 2015/0208607 A1 Jul. 30, 2015

(51) Int. Cl.
*A01K 1/03* (2006.01)
*A01K 1/02* (2006.01)
(Continued)

(52) U.S. Cl.
CPC .............. *A01K 1/032* (2013.01); *A01K 1/02* (2013.01); *A01K 1/03* (2013.01); *A01K 1/031* (2013.01); *A01K 31/06* (2013.01); *A01K 31/08* (2013.01)

(58) Field of Classification Search
CPC . A01K 1/03; A01K 1/032; A01K 1/31; A01K 31/06; A01K 31/08; A01K 1/0245; A01K 1/02; A01K 1/034
(Continued)

(56) References Cited

U.S. PATENT DOCUMENTS

| 4,909,188 A | * | 3/1990 | Tominaga | A01K 31/06 119/474 |
| 5,040,490 A | * | 8/1991 | DeRoche | A01K 1/0245 119/400 |

(Continued)

FOREIGN PATENT DOCUMENTS

DE 102007018878 A1 10/2008

OTHER PUBLICATIONS

International Search Authority, Search Report for International Application PCT/IB2012/052462, Jan. 21, 2013 (EPO), 1 pages, The Hague, Netherlands.

*Primary Examiner* — Leslie A Nicholson, III
*Assistant Examiner* — Kimberley S Wright
(74) *Attorney, Agent, or Firm* — Ference & Associates LLC

(57) ABSTRACT

A cage (10) for rabbits or similar pets comprising a grill element (11) generally having a rectangular shape and which can be curved or shaped at the top as required, and where the grill element is applied to the top edge of a basin-shaped tray with modular walls and where this base comprises a bottom surface (13) and side walls (14, 15) which respectively form the long sides and the short sides of the tray, where the cage can be joined to at least one further cage alongside, where the cages are joined by removing from each of the cages their respective vertical wall (15) on the joining side, preferably the short side but also the long side, and where the two trays are held together by a specially shaped horizontal profile (18) with an up-turned "U" shape comprising the two vertical sides (19) which overlap on the joined edges of the tray bottoms positioned side by side.

5 Claims, 5 Drawing Sheets

(51) Int. Cl.
*A01K 31/06* (2006.01)
*A01K 31/08* (2006.01)

(58) Field of Classification Search
USPC .............. 119/452, 453, 459, 462, 482, 502
See application file for complete search history.

(56) References Cited

U.S. PATENT DOCUMENTS

| | | | |
|---|---|---|---|
| 5,452,681 A * | 9/1995 | Ho | A01K 31/08 119/461 |
| 5,544,619 A * | 8/1996 | Braun | A01K 31/08 119/461 |
| 5,671,697 A * | 9/1997 | Rutman | A01K 1/0245 119/472 |
| D427,730 S * | 7/2000 | Powers | D30/114 |
| 6,460,486 B1 * | 10/2002 | Powers | A01K 1/0245 119/452 |
| 6,655,321 B1 * | 12/2003 | Ozeri | A01K 1/0245 119/417 |
| 6,763,784 B1 | 7/2004 | Liu | |
| 7,487,744 B1 * | 2/2009 | Goldberg | A01K 1/031 119/453 |
| 7,584,720 B1 * | 9/2009 | Jackson | A01K 1/034 119/452 |
| 8,336,500 B1 * | 12/2012 | Britt | 119/472 |
| 8,408,416 B2 * | 4/2013 | Cheng-Lung | A01K 1/031 119/481 |
| 8,733,293 B2 * | 5/2014 | Link | A01K 1/0017 119/474 |
| 9,095,120 B1 * | 8/2015 | Skaggs | A01K 1/0245 |
| 9,167,799 B2 * | 10/2015 | Casto | A01K 1/03 |
| 2001/0054394 A1 * | 12/2001 | Marchioro | A01K 1/0245 119/452 |
| 2006/0288952 A1 * | 12/2006 | Plante | A01K 31/08 119/461 |
| 2007/0000447 A1 * | 1/2007 | Jakubowski | A01K 31/08 119/453 |
| 2007/0012257 A1 * | 1/2007 | Siegal | A01K 31/06 119/479 |
| 2008/0245313 A1 * | 10/2008 | Jakubowski | A01K 1/0245 119/497 |
| 2009/0223461 A1 * | 9/2009 | Trunnell | A01K 1/0245 119/472 |
| 2009/0288613 A1 * | 11/2009 | Ho | A01K 1/0245 119/482 |
| 2010/0089336 A1 * | 4/2010 | Flannery | A01K 1/0245 119/498 |
| 2010/0200580 A1 * | 8/2010 | Cheng-Lung | A01K 31/002 220/4.01 |
| 2011/0220033 A1 * | 9/2011 | Sangl | A01K 1/0245 119/455 |
| 2014/0026820 A1 * | 1/2014 | Casto | A01K 31/08 119/474 |
| 2014/0116347 A1 * | 5/2014 | Casto | A01K 1/03 119/474 |
| 2014/0366811 A1 * | 12/2014 | Tominaga | A01K 1/032 119/482 |
| 2015/0237822 A1 * | 8/2015 | Jason | A01K 1/03 119/480 |

* cited by examiner

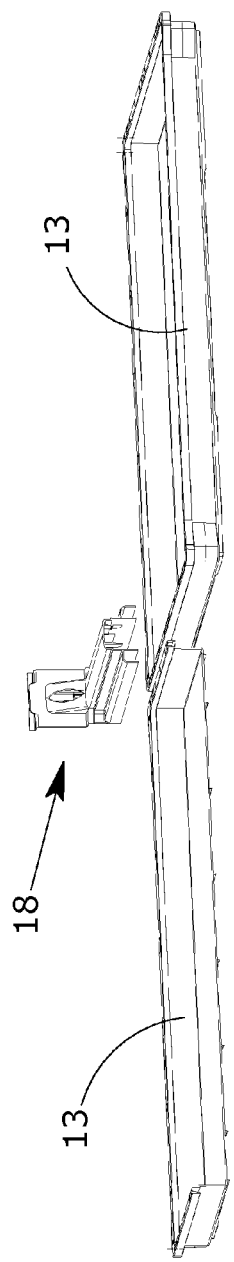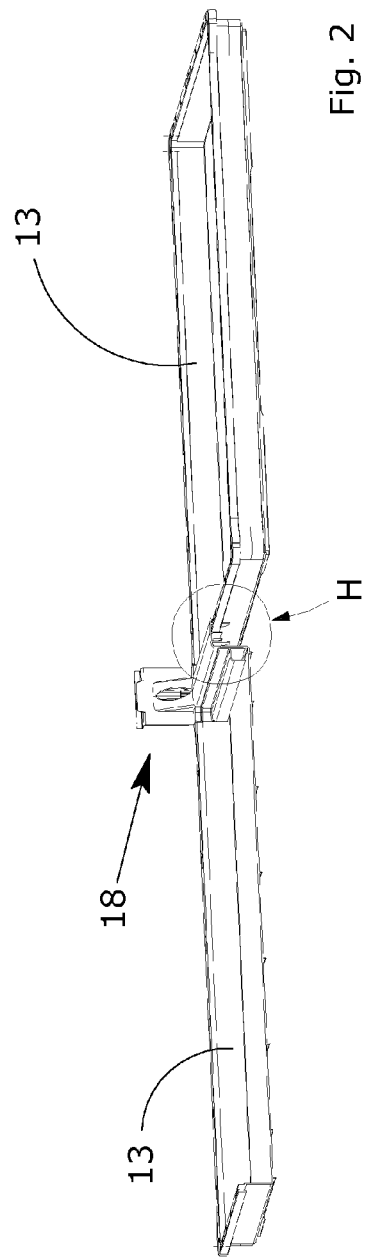

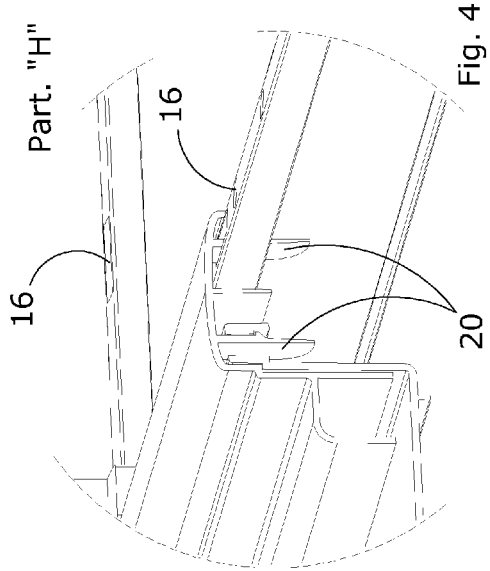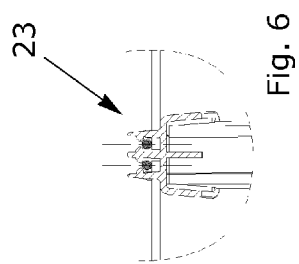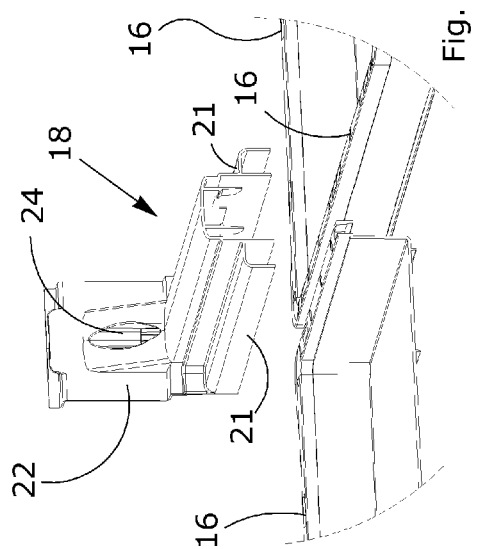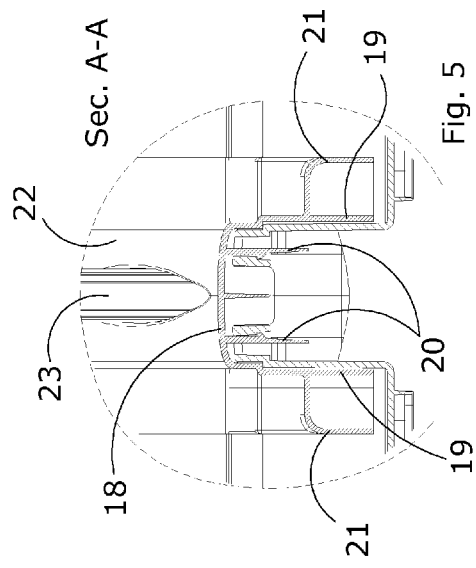

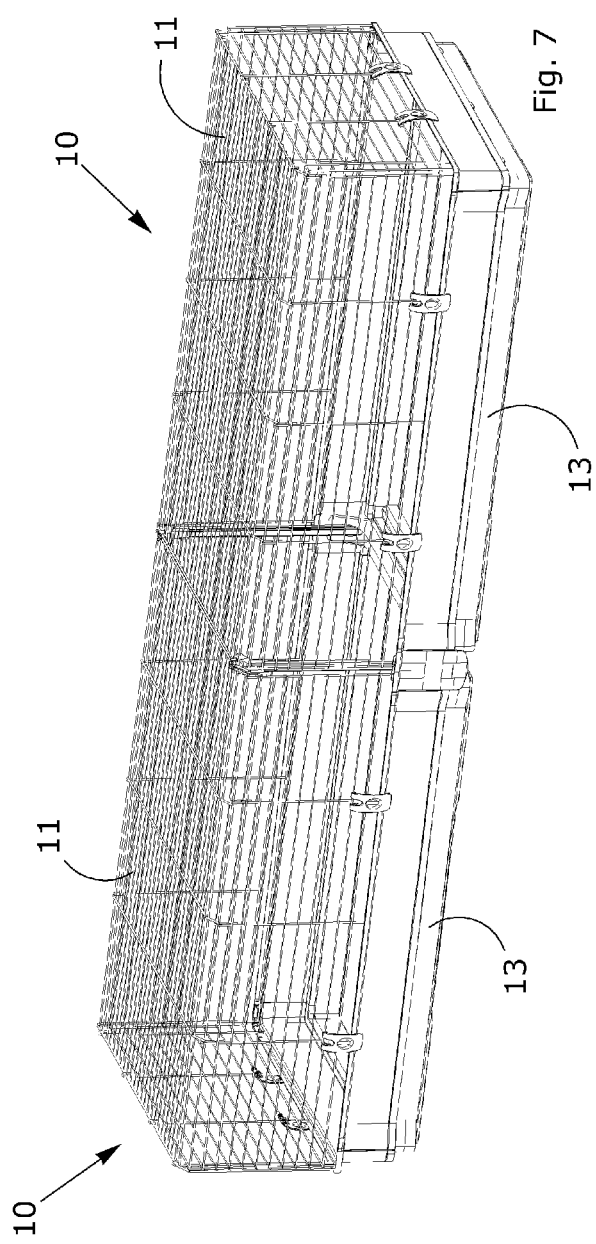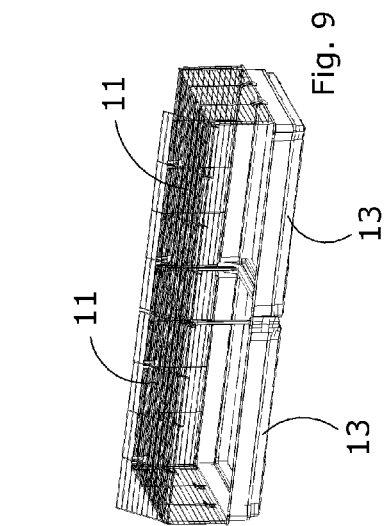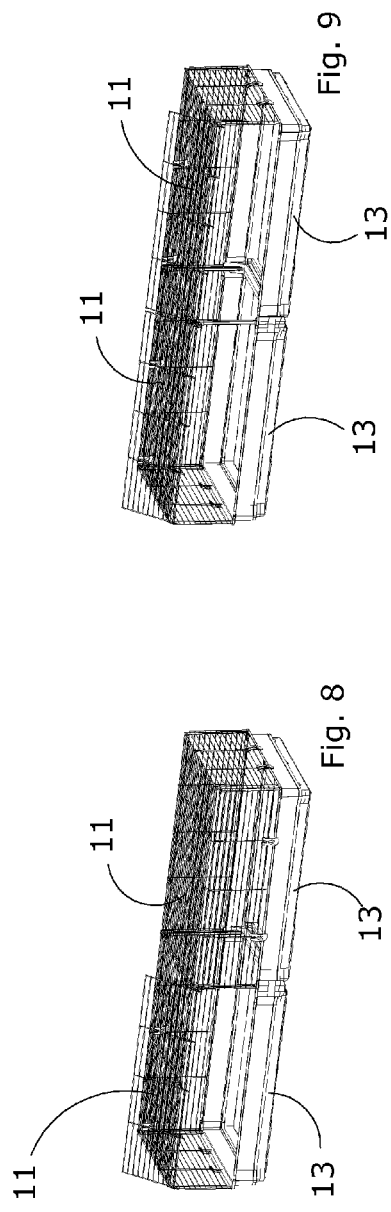

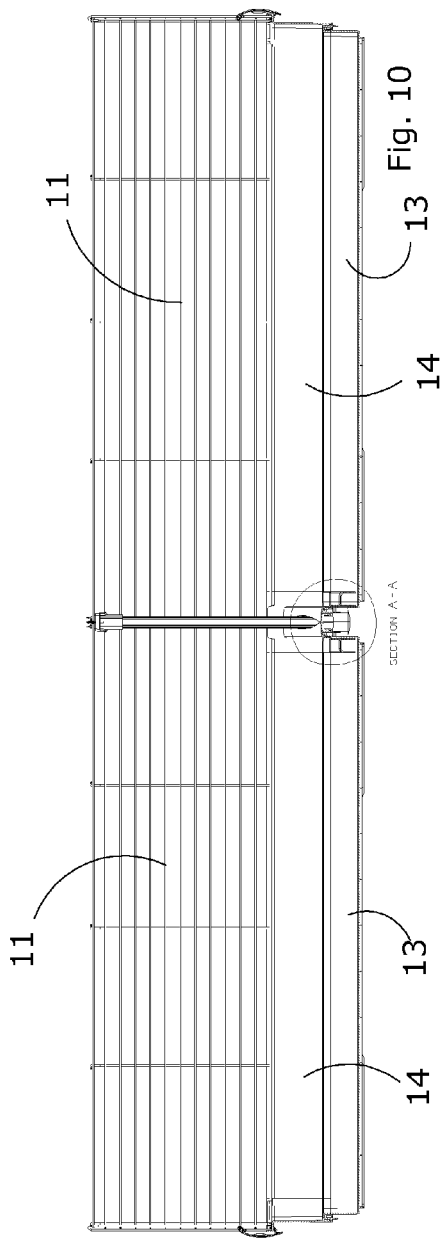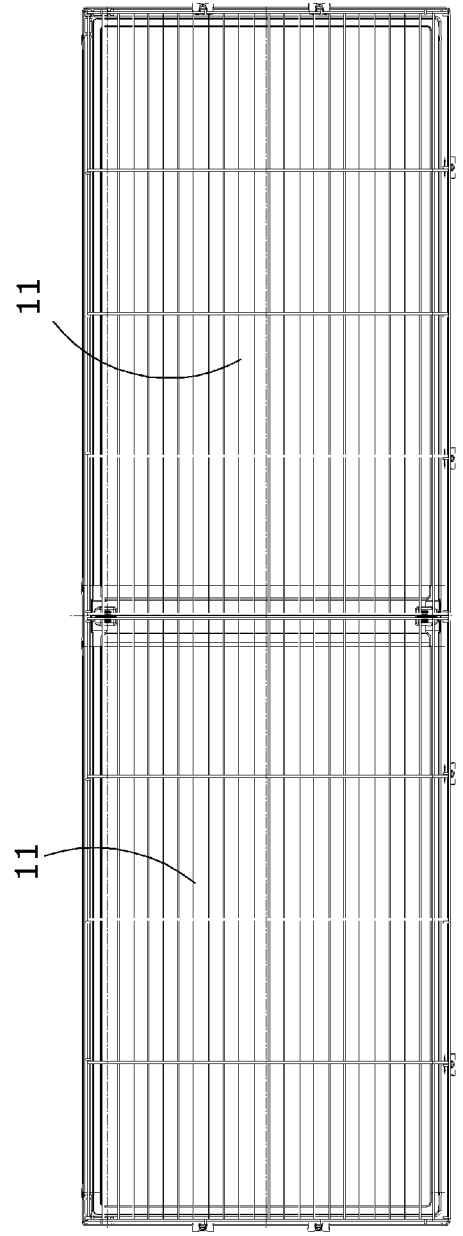

MODULAR CAGE FOR PETS, IN PARTICULAR RABBITS

TECHNICAL FIELD

The present invention relates to a cage for pet animals, in particular rabbits or similar pets, whose principal characteristic is that it is modular and can be attached to other similar cages to form a single compartment of twice or three times the size thereby providing a larger living space for the pet.

In particular, the present invention relates to a cage designed to increase the space available by joining together two or more cages for pets, in particular rabbits or similar, thereby providing a larger living space for the pet.

In practice, the cage according to present invention is made using a modular bottom where one of the walls, which can be one of the short sides or one of the long sides, can be opened so that a second cage made in the same way can be attached to it with suitable connecting means. This feature makes it possible to join two cages together thus providing a single space of twice the size.

The present invention can be applied in the sector for components and accessories for pet animals, and in particular can be applied in the sector for cages for rabbits and similar pets.

BACKGROUND ART

Various types of cage for pet animals, in particular for rabbits and other animals of a similar size, are well known.

Usually, the cages for pet rabbits or other pets comprise a grill cage, usually rectangular and sometimes with a curved or shaped top. The grill cage sits on top of a basin-shaped base or tray.

The basin-shaped base positioned under the grill cage acts as a tray for the litter, a sandy or granular material which absorbs urine and faeces and also provides a warm, comfortable environment for the pet.

A common problem with rabbit cages of the known type is that the space provided for the pet is limited or even insufficient. Restricted, insufficient living space is harmful to the pet's health and welfare.

The only solution in these cases is to use much larger cages. However, this does not solve the problem completely because many homes do not have the sufficient extra space needed to accommodate a large, fixed cage.

DESCRIPTION OF THE INVENTION

The present invention provides a cage for pet animals, in particular for rabbits and similar pets, which makes it possible to eliminate or at least reduce the drawbacks described above.

The invention provides a cage for rabbits or similar pets which has a simple design and uses a modular system to solve the shortcomings described above.

This purpose is achieved by a cage for rabbits or similar pets with the characteristics described in the main claim.

The dependent claims describe advantageous embodiments of the invention.

The principal advantages of this solution, in addition to all those which derive from its simple, easy to manufacture design, primarily concern the fact that the space provided for the pet can be doubled by using a system for joining the cages which renders the system modular.

The solution described in the present invention uses the construction system of a previous invention deposited by the same applicant. This system is based on multiple components which can be assembled and disassembled as required. It comprises a base, two long sides and two shorts sides. When assembled, the base has vertical or nearly vertical side walls. This considerably increases the amount of available space and at the same time solves the problems linked to stocking and compliance with national regulations.

DESCRIPTION OF THE DRAWINGS

Further features and advantages of the invention will become apparent from the description of an embodiment which follows with reference to the annexed drawings, given purely by way of a non-limiting example, in which:

FIG. 1 shows a perspective drawing of the two modular bottoms for modular cages according to the present invention, in the open position;

FIG. 2 shows a perspective drawing of the two modular bottoms for modular cages according to the present invention, in the closed position;

FIGS. 3 to 6 show details of various parts of the invention, namely the means for connecting the modular cages;

FIGS. 7 to 9 show two cages assembled using the connection system according to the present invention;

FIGS. 10 and 11 show respectively the front view and the plan view of the two cages joined to each other;

DESCRIPTION OF ONE EMBODIMENT OF THE INVENTION

Figure 12:
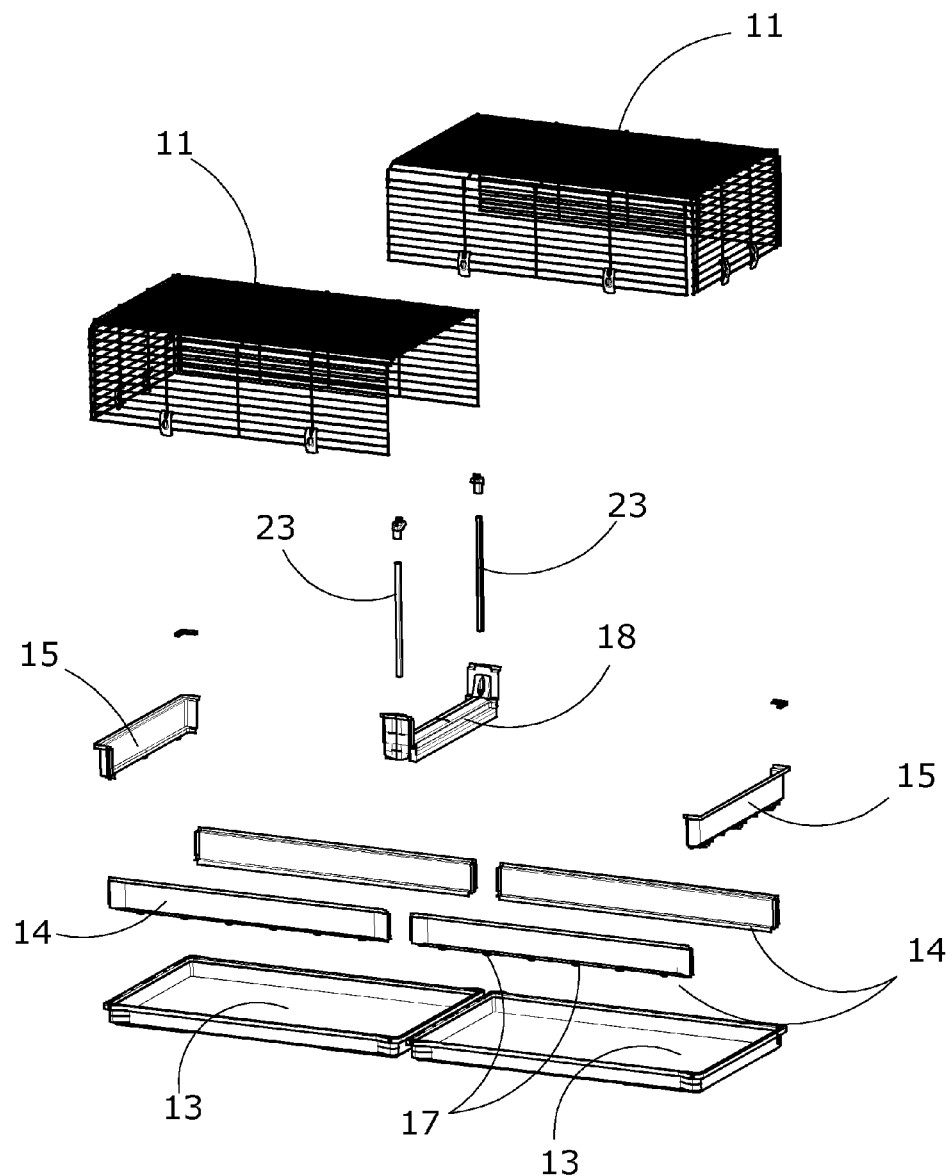
FIG. 12 shows an exploded view of the modular cage.

The annexed figures show a cage for rabbits or similar pets, according to the present invention and indicated in its entirety by the number 10, where the cage substantially comprises a grill element 11 generally having a rectangular shape and which can be curved or shaped at the top as required, and where the grill cage is applied to the top of the upper perimeter of the basin-shaped tray 12 with modular walls where the base comprises a bottom surface 13 and side walls 14 and 15 which respectively form the long sides and the short sides of the tray.

The three parts comprising the tray, that is, the bottom surface 13, the two long sides 14 and the two short sides 15, are injection moulded separately, and the bottom surface 13 has along its perimeter an edge with slots and/or holes 16 for engaging with the snap tabs 17 positioned along the lower edges of the side panels 14 and 15.

According to the present invention the two trays with the characteristics described above are joined on one side, that is, the connection side, which is preferably the short side but which can also be the long side, which is left without the vertical closing side 15 which acts as an edge.

To hold the two trays together there is a specially shaped horizontal profile 18 with an upturned "U" shape whose two vertical sides 19 overlap on the edges of the tray bottom and whose internal teeth 20 enter the seats 16 and remain fixed to these by the shape of the teeth which snap into place and lock in the seats.

The profile 18 also has further lower side tabs 21 which form a sealing step, and vertical walls 22 located at the two ends, which enable connection to the grill element 11 of the cage.

In this case the grill element 11 is made with a system designed to enable removal of the grill walls which must be removable in order to enable joining of the cages. To close the vertical sides of the grills the system uses profiles 23 which connect and lock the respective joining edges to each other.

The two vertical walls 22 are shaped to enable the closing of the space between the two edges 14 located on the same side.

It should be noted that the modular cages comprising the features described can be joined and connected alongside each other as and when required and can if necessary remain totally separate without using the double surface; this demonstrates that the system is perfectly modular and can be adapted as required to user needs.

The invention is described above with reference to a preferred embodiment. It is nevertheless clear that the invention is susceptible to numerous variations which lie within the scope of its disclosure and within the framework of technical equivalents.

The invention claimed is:

1. A cage comprising:
   a grill element, wherein the grill element is a rectangular shape and is applied to the top edge of a basin-shaped tray with modular walls;
   the basin shaped tray comprises a bottom surface and side walls forming long and short sides of the tray; and wherein the cage can be joined to another cage by removing a vertical wall on a joining side and further wherein the tray of each cage is attached by a profile, wherein the profile is a specially shaped horizontal upturned curve comprising two vertical sides of each attached cage,
   wherein the two vertical sides overlap joined edges of the attached tray bottoms;
   wherein the cage has lower side tabs forming a combined unit and the vertical sides of each attached cage connect to the grill of the cage;
   wherein parts forming the connected tray, comprises a bottom surface, two long sides and two short sides, wherein the bottom surface has along its perimeter an edge with holes for engaging corresponding snap taps positioned along lower edges of corresponding side panels;
   wherein the profile has lower side tabs forming a seal, and vertical walls connecting the grill element of the cage;
   wherein the grill element is made with a system enabling removal of the grill walls to join the cages and with a system to close the vertical sides of the grills using profiles to connect and lock the joining edges;
   wherein the two vertical walls of the profile enable the closing of the space between the two edges located on the same side;
   wherein the profile, comprises two vertical sides overlapping the edges of the tray bottom and having internal teeth entering the seats and remaining fixed to the shape of the teeth snapping into place and locking in the seats; and
   wherein the profile, comprises two vertical sides which overlap on the edges of the tray bottom and have holding means on the inside and the outside of the profile.

2. The cage according to claim 1, wherein the parts forming the tray are injection molded separately.

3. The cage according to claim 2, wherein the vertical walls connecting the grill element are located at the two ends.

4. The cage according to claim 3, wherein the grill element enables removal of the grill to join the cages and with a system to close the vertical sides of the grills using the profiles to connect and lock the joining edges.

5. The cage according to claim 1, wherein the vertical walls connecting the grill element are located at the two ends.

* * * * *